United States Patent
Dewaele et al.

(10) Patent No.: US 9,112,730 B2
(45) Date of Patent: Aug. 18, 2015

(54) CENTRALIZED METHOD FOR CERTIFYING CREDENTIALS

(71) Applicant: CVTRUST SPRL, Brussels (BE)

(72) Inventors: Pierre-David Dewaele, Ra'Anana (IL); David Goldenberg, Brussels (BE)

(73) Assignee: CVTRUST SA, Brussels (BE)

( * ) Notice: Subject to any disclaimer, the term of this patent is extended or adjusted under 35 U.S.C. 154(b) by 246 days.

(21) Appl. No.: 13/646,607

(22) Filed: Oct. 5, 2012

(65) Prior Publication Data

US 2014/0101264 A1     Apr. 10, 2014

(51) Int. Cl.
| | | |
|---|---|---|
| G06F 15/16 | (2006.01) | |
| H04L 12/58 | (2006.01) | |
| H04L 29/06 | (2006.01) | |

(52) U.S. Cl.
CPC ............. *H04L 12/58* (2013.01); *H04L 51/00* (2013.01); *H04L 63/0414* (2013.01); *H04L 63/08* (2013.01); *H04L 63/0428* (2013.01)

(58) Field of Classification Search
USPC .................... 709/206, 224, 200; 726/5, 27
See application file for complete search history.

(56) References Cited

U.S. PATENT DOCUMENTS

| 2011/0106550 A1* | 5/2011 | Skelton .................... 705/1.1 |
| 2012/0116907 A1 | 5/2012 | Skelton et al. |
| 2012/0198017 A1* | 8/2012 | LeVasseur et al. ........... 709/206 |

OTHER PUBLICATIONS

CVTrust—"Home Page", © CVTRUST, 2009, p. 1 of 1, http://web.archive.org/web/20110524202134/http://www.cvtrust.com/Default.aspx Nov. 8, 2013.
CVTrust—"How Does it Work for Jobseekers?", © CVTRUST, 2009, p. 1 of 1, http://web.archive.org/web/20110524195016/http://www.cvtrust.com/WhyForCandidates . . . Nov. 8, 2013.
CVTrust—"How Does It Work for Recruiters?", © CVTRUST, 2009, p. 1 of 1, http://web.archive.org/web/20110526011603/http://www.cvtrust.com/WhyForRecruiters.a . . . Nov. 8, 2013.
CVTrust—"About CVTrust", © CVTRUST, 2009, p. 1 of 1, http://web.archive.org/web/20110624230105/http://www.cvtrust.com/About.aspx Nov. 8, 2013.
CVTrust—"Home Page—A New Version is being forged at the CVTrust foundry", p. 1 of 1, http://web.archive.org/web/20110906091124/http://www.cvtrust.com/Index.html Nov. 8, 2013.
CVTrust—"Smart Diploma™" pp. 1 to 3, http://web.archive.org/web/20111201172122/http://www.cvtrust.com/Tour.aspx Nov. 8, 2013.
CVTrust—"Tour", pp. 1 to 2, http://web.archive.org/web/20111130222627/http://www.cvtrust.com/Tour.aspx Nov. 8, 2013.

* cited by examiner

*Primary Examiner* — El Hadji Sall
(74) *Attorney, Agent, or Firm* — Knobbe, Martens, Olson & Bear, LLP

(57) ABSTRACT

A method for collectively delivering electronically certified credentials is disclosed. In one aspect, the method includes a) collecting personal data related to credential recipients and including a valid electronic mail address, b) collecting data related to each credential to be delivered to each recipient at a granting authority, c) sending to a centralized server of a certifying authority the collected data of each recipient, the data being stored in a centralized database, d) sending an personalized e-mail corresponding to each recipient, the e-mail including a link to the centralized server, for approval of the data related to the each recipient, and e) activation of the electronic credential.

17 Claims, 5 Drawing Sheets

CENTRALIZED METHOD FOR CERTIFYING CREDENTIALS

FIELD OF THE INVENTION

The disclosed technology is related to a centralized method and a system for certifying electronic (dematerialized) credential.

DESCRIPTION OF THE RELATED TECHNOLOGY

Nowadays, the exchange of information is performed predominantly by dematerialised media, such as internet website, e-mail, SMS, . . . . This is particularly true in job prospection, more particularly when the potential employer is geographically distant from the job applicant (recipient).

In that case, the potential employer usually has difficulties to verify the accuracy of the data given in a personal resume. In some critical cases, it could be needed to verify the diploma of the recipient by, for example, calling the academic institution which has granted the diploma. This represents high costs for the potential employer and is time consuming for both the academic institution and the potential employer.

It is known in the art to use centralized databases for credentials associated to individuals such as described in US patent application 2012/0116907 to simplify the access to certified credential information by interested third parties (such as potential employer). That document discloses, a method wherein an individual asks a service provider to certify the authenticity of all information in a resume, each information being verified by inquiry to granting authority before being certified. The verified resume information is then kept on a database for later access to interested third parties. From the granting authority point of view, this means that such request can be performed at any time, which again represents a time consuming activity.

SUMMARY OF CERTAIN INVENTIVE ASPECTS

One inventive aspect is related to a method for collectively delivering electronically certified credentials. The method includes a) collecting personal data related to credential recipients, the data comprising a valid electronic mail address, b) collecting data related to each credential to be delivered to each recipient at a granting authority, c) sending to a centralized server of a certifying authority the collected data of each recipient, the data being stored in a centralized database, d) sending an personalised e-mail corresponding to each recipient, the e-mail comprising a link to the centralized server, for approval of the data related to the each recipient and, e) activation of the electronic credential.

Another aspect of the invention is related to a method for collectively delivering electronically certified credentials. The method includes a) receiving in a centralized server from a certifying authority data related to each recipient, the data being stored in a centralized database and the data comprising at least for each recipient a valid electronic mail address and the data needed for delivering the electronically certified credentials, and b) sending an e-mail to each recipient, the e-mail comprising a hyperlink to the centralized server, for approval of the data related to the each recipient and activation of the electronic credential.

In one aspect, the methods may include one or more of the following features:
the collected data related to each recipient is encrypted, the e-mail sent to each recipient comprising a unique key for decrypting the encrypted data upon approval and activation by the recipient;
the credential is related to academic diploma;
more than one credential can be stored in the centralized database for each recipient, each of the credential being approved according to the method described above;
the sending step comprises an authentication procedure for certifying the source of the collected data;
the approval and activation step comprises the step of making the approved credential accessible to interested third parties.

Another inventive aspect is related to a system for implementing the method. The system may include a) a communication unit for receiving data related to credential information related to recipients, sending e-mail to recipients and getting electronic approval from each recipient, b) an authentication unit for certifying the source of the data, c) a database for storing the data related to each recipient, d) a central processing unit, and e) a permanent storage module comprising computer program instructions in a programming language which when executed on the processing unit performs the method described herein.

In one aspect, the system may further comprise one or more of the following features:
a communication unit for giving access to the certified credential data to interested third parties;
an encryption/decryption unit for encrypting and decrypting the data related to each credential; and
a signing unit for electronically signing certified credentials.

DETAILED DESCRIPTION OF CERTAIN ILLUSTRATIVE EMBODIMENTS

Figure 1:
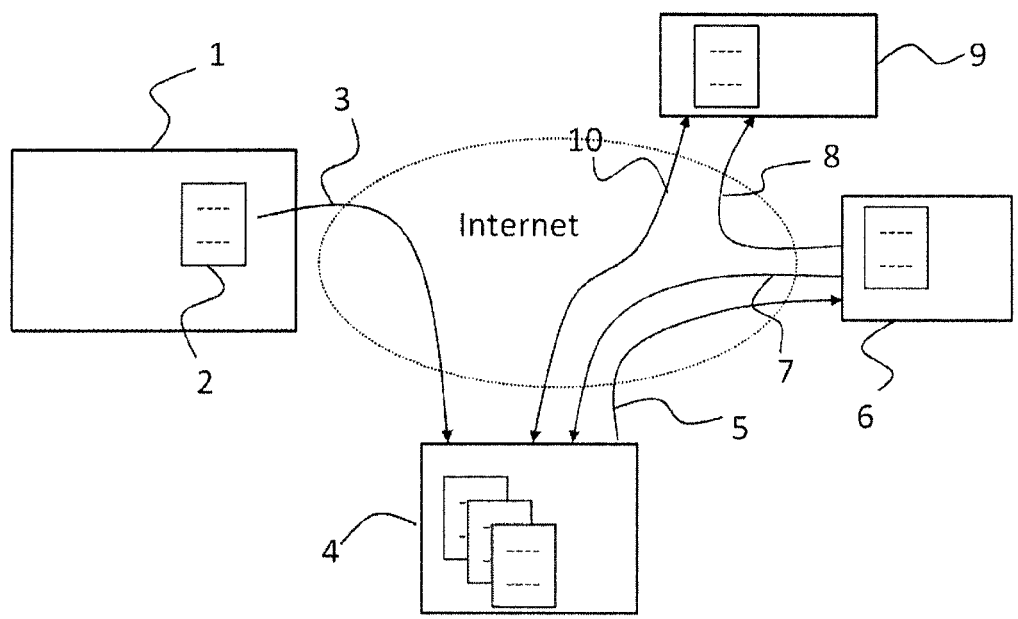
FIG. 1 illustrates an example communication channels.

Certain embodiments relate to a centralized method and a centralized system for collectively delivering certified credential from a granting authority.

By "centralized", it is meant that more than one credential can be delivered at once from a granting authority, and that all credentials related to all recipients can be delivered and stored on the same delivering system.

Advantageously, the credentials delivered are related to diploma, or credentials used in professional resumes which are collectively granted at particular dates (for example, for all successful students at the end of the academic year, or participants to professional continuous training workshop, . . . ).

In one embodiment, the granting authority collects first the list of recipients to be granted, along with the data related to the corresponding credential.

In one embodiment, there are two types of data, dynamic data related to each recipients, and static data related to the credential itself (template credential).

The granting authority then sends the collected data to the server. Preferably, the upload of the collected data is performed by means of a secured communication channel wherein the verification of the identity of the authority is performed before the upload process.

The data received by the server is then stored in a database located in the server, and an e-mail is sent to the recipient of the credential, for verification and activation. The sent e-mail comprises an hyperlink to a web page (preferably a dynamic web page) comprising the data related to the corresponding credential.

In one embodiment, the data related to each recipient may be encrypted before being stored on the database, the unique key necessary to decrypt the data being comprised in the e-mail sent to the corresponding recipient, and the e-mail sent to each recipient is deleted from the server after sending, so that the encrypted data cannot be retrieved (and decrypted) without the explicit consent of the recipient.

Once the recipient has received the e-mail comprising the unique key, he can follow the hyperlink to the corresponding web page on the server and provide the unique key for authorising the decryption of the corresponding credential data. A credential in electronic format is then generated, using the decrypted data. A copy of the generated credential is then stored on the server database, and an hyperlink to the credential is given to the recipient for subsequent use.

Advantageously, more than one document can be generated upon activation, for example, in case of multiple credentials related to one academic program.

It should be noticed at this stage that even if the activation e-mail is intercepted by a malicious third party, it can only be used to generate the credential related to the right recipient (i.e. the third party cannot obtain an undue credential by using the decrypting key).

The recipient can then print the generated credential, or save it in electronic format for further use. Advantageously, the printed credential comprises a graphically coded URL pointing to the server for an easy verification of its authenticity by an interested third party such as a potential employer. For example, the printed credential can comprise a QR-code coding the URL pointing to the credential of the certifying server.

The recipient can then share the certified credential with interested third parties either by directly sending printed or electronic credentials, or by including in a communication an URL pointing to the certified credential on the centralized server. This last procedure is particularly useful for sharing certified credential related to professional resume on professional social network.

The electronic credential can also include an electronic signature for off-line verification of the authenticity of the credential.

FIG. 1 presents one embodiment of the invention. In that embodiment, an authority 1 sends 3 to a centralized server 4 data 2 related to credentials to be granted to recipients 6.

Upon reception of data 2 related to the credentials to be granted, the centralized server 4 encrypts the data to maintain privacy of the data received in server 4 without the explicit consent of the recipients 6 and sends a communication 5 to each recipient 6. The data related to the communication is deleted from the server 4 after the sending process, so that, only encrypted data is kept in the server.

Therefore server 4 comprises at least means for receiving data such as for example a POP server for receiving e-mails from the authority 1. Preferably, it further comprises means for authenticating the source of the communication 3. This can be done for example by means of a dynamic web page requesting a login and a password, the granting authority being able to upload the data to the server only if a valid login and password have been provided.

The encryption of the data can be done by means of known encryption algorithm using a unique encryption key for each recipient, for example coded by php on a dynamic web server such as apache. The encrypted data can then be stored for example on a SQL database such as a MySQL server. The unique encryption key can for example be generated by a random number generator.

Alternatively, the unique key can be derived from the identification key of the granting authority, so that the authority can decrypt the individual data of the recipient for further follow-up (status verification, re-sending of the activation e-mail to another e-mail address, . . . ).

The communication 5 sent to each recipient comprises the unique activation and decryption key and an hyperlink to a dynamic web page on server 4, the data related to each recipient and the corresponding credential being decrypted only if and when the recipients gives explicit consent to the storage of data on the server 4. For example, the hyperlink points to a dynamic webpage located on the server, the hyperlink comprising the data permitting to php code to retrieve the encrypted data related to the receiving recipient. The then generated dynamic webpage comprises a key field wherein the recipients fills his unique decryption key thereby giving explicit consent for the storage of his data. The decryption key can advantageously be included in the hyperlink, so that the recipient does not need to write it in a form.

After reception of the explicit consent of the recipients, the server decrypts the corresponding data and make the corresponding electronic credential available for downloading by the recipient. Advantageously, the generated credential comprises an electronic certificate which can be verified offline. The recipient can then send 8 the generated electronic credential to interested third party 9.

In one embodiment, the electronic credential further comprises a hyperlink to the database 4 for further verification of the authenticity of the credential online. Such hyperlink can have the form of a classic hyperlink on an electronic document, but, can also be coded as a visual code recognisable by a computer or a smartphone, such as a QR-code. In that case, even printed credential can easily be verified online.

The hyperlink comprised on each credential are interpreted by the webserver on the server 4 to generate the corresponding credential based upon the decrypted data located on the server. Again, this can be done on webserver comprising php interpreter and coupled to an SQL database.

Figure 2:
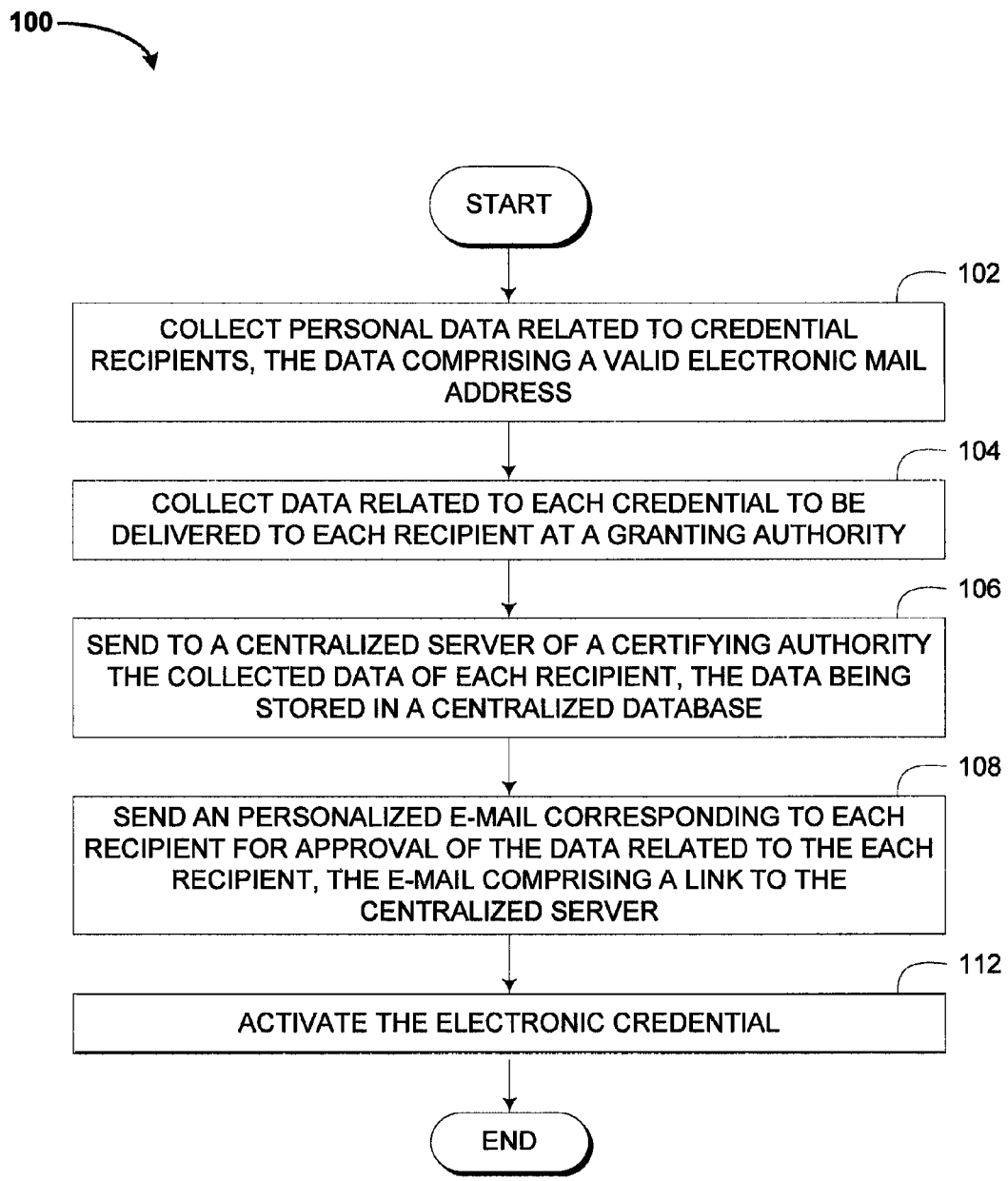
FIG. 2 shows a flowchart of one embodiment of a method of collectively delivering electronically certified credentials.

FIG. 2 shows a flowchart of one embodiment of a method of collectively delivering electronically certified credentials. The method 100 includes at block 102 collecting personal data related to credential recipients, the data comprising a valid electronic mail address. Next at block 104, the method includes collecting data related to each credential to be delivered to each recipient at a granting authority. Moving to block 106, the method includes sending to a centralized server of a certifying authority the collected data of each recipient, the data being stored in a centralized database. Next at block 108, the method includes sending an personalized e-mail corresponding to each recipient for approval of the data related to the each recipient, the e-mail comprising a link to the centralized server. Moving to block 112, the method includes activating the electronic credential.

Figure 3:
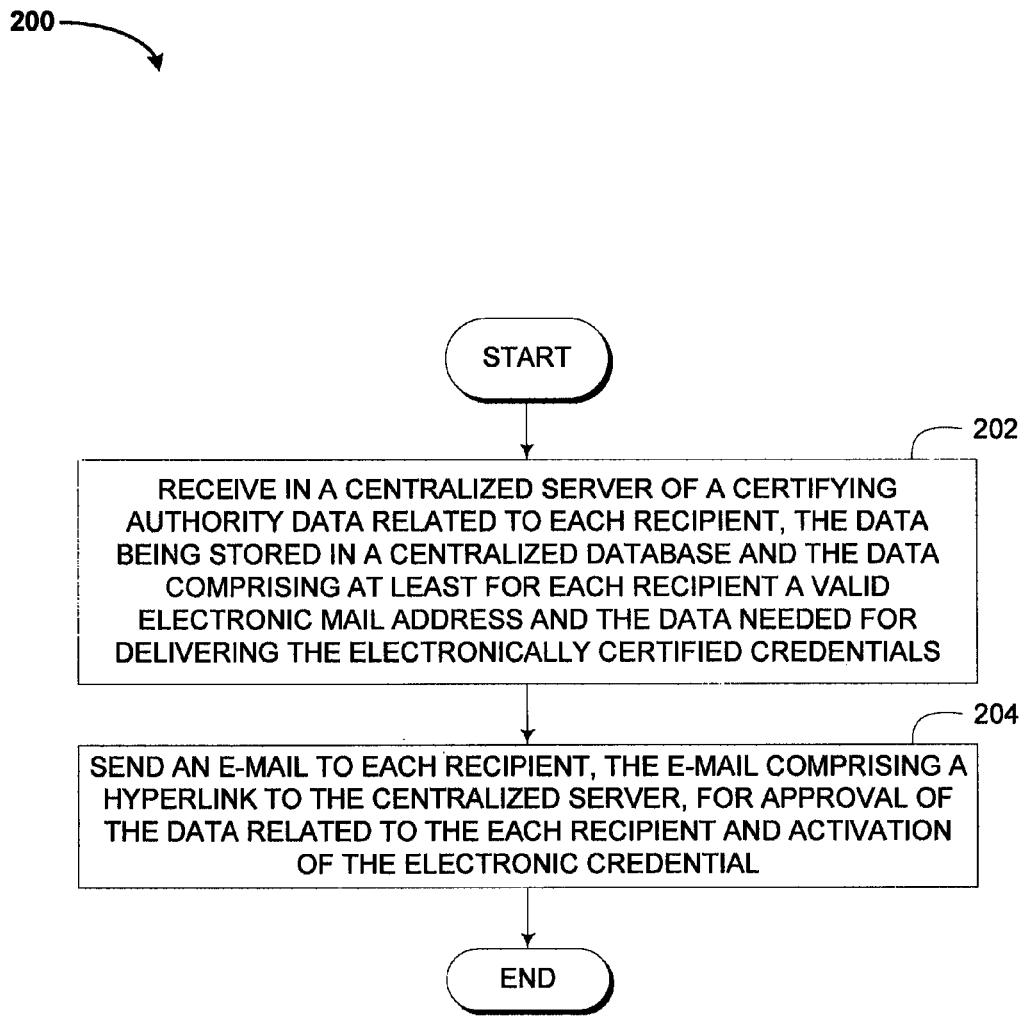
FIG. 3 shows a flowchart of another embodiment of a method of collectively delivering electronically certified credentials.

FIG. 3 shows a flowchart of another embodiment of a method of collectively delivering electronically certified credentials. The method 200 includes at block 202 receiving in a centralized server of a certifying authority data related to each recipient, the data being stored in a centralized database and the data comprising at least for each recipient a valid electronic mail address and the data needed for delivering the electronically certified credentials. Next at block 204, the method includes sending an e-mail to each recipient, the e-mail comprising a hyperlink to the centralized server, for approval of the data related to the each recipient and activation of the electronic credential.

Figure 4:
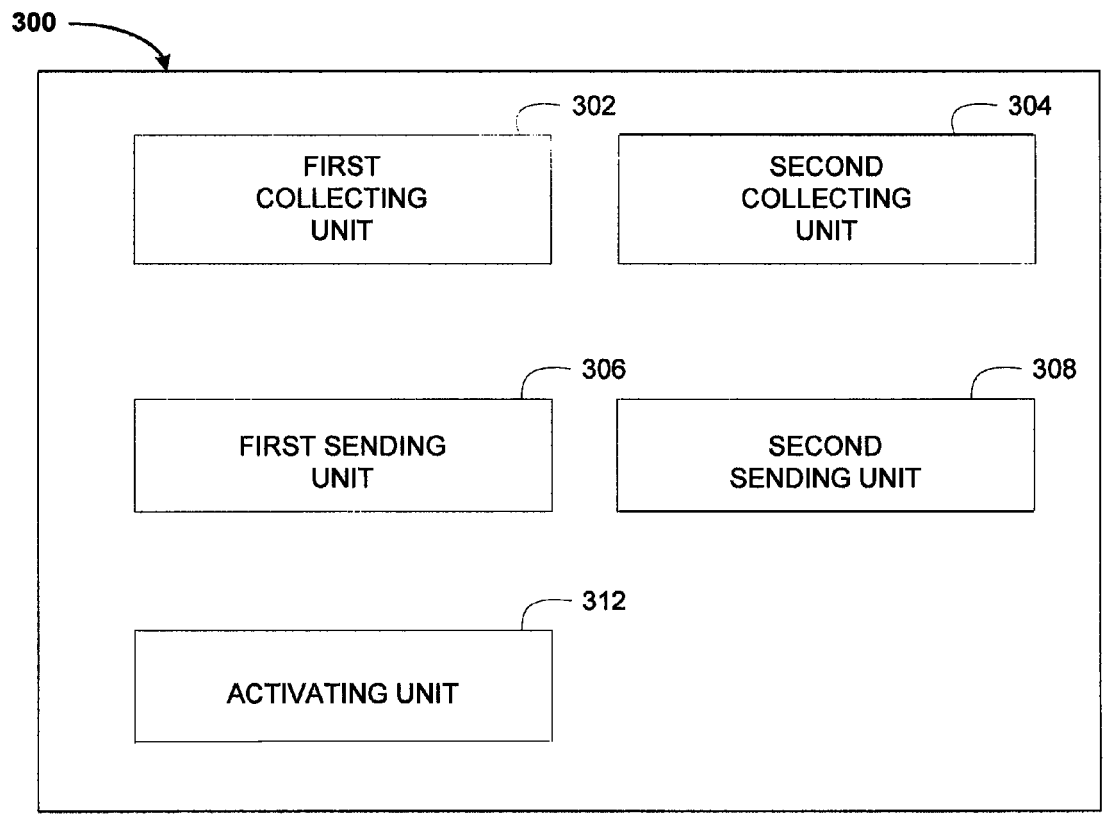
FIG. 4 shows a flowchart of one embodiment of a system for collectively delivering electronically certified credentials.

FIG. 4 shows a flowchart of one embodiment of a system for collectively delivering electronically certified credentials. The system 300 includes a first collecting unit 302 configured to collect personal data related to credential recipients, the data comprising a valid electronic mail address. The system 300 may further include a second collecting unit 304 configured to collect data related to each credential to be delivered to each recipient at a granting authority. The system may further include a first sending unit 306 configured to send to a centralized server of a certifying authority the collected data of each recipient, the data being stored in a centralized database. The system may further include a second sending unit 308 configured to send an personalized e-mail corresponding to each recipient for approval of the data related to the each recipient, the e-mail comprising a link to the centralized server. The system may further include an activating unit 312 configured to activate the electronic credential.

Figure 5:
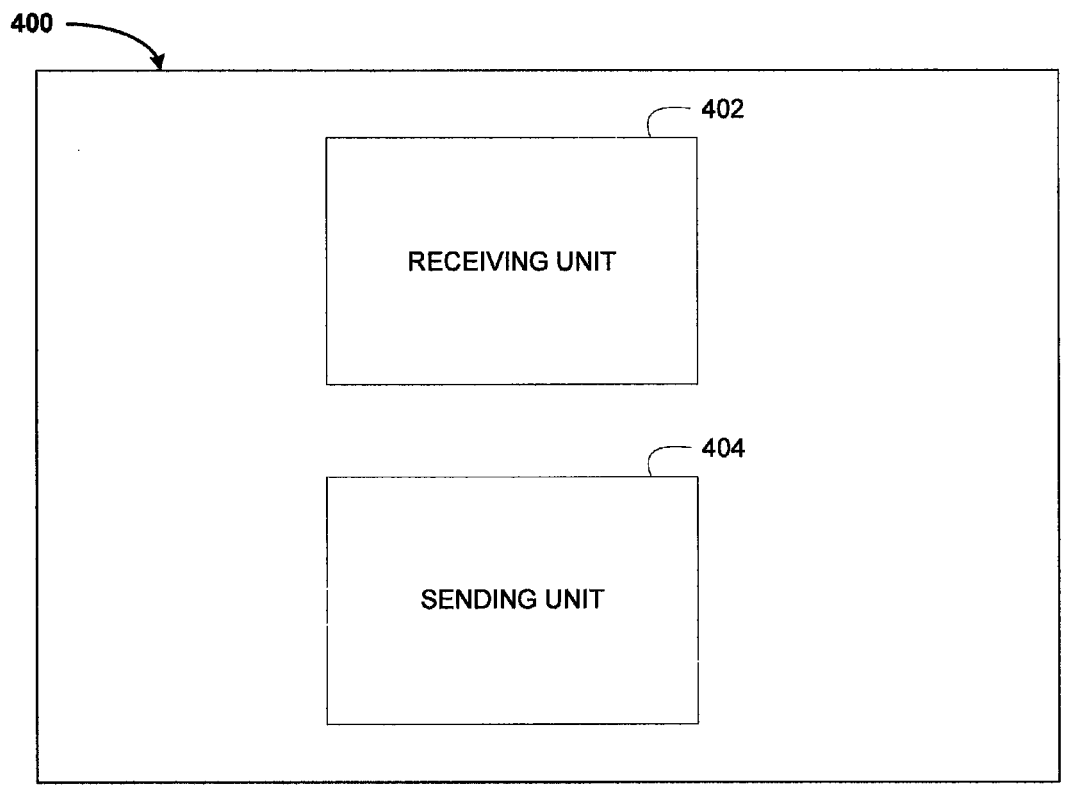
FIG. 5 shows a flowchart of another embodiment of a system for collectively delivering electronically certified credentials.

FIG. 5 shows a flowchart of another embodiment of a system for collectively delivering electronically certified credentials. The system includes a receiving unit 402 configured to receive in a centralized server of a certifying authority data related to each recipient, the data being stored in a centralized database and the data comprising at least for each recipient a valid electronic mail address and the data needed for delivering the electronically certified credentials. The system may further include a sending unit 404 configured to send an e-mail to each recipient, the e-mail comprising a hyperlink to the centralized server, for approval of the data related to the each recipient and activation of the electronic credential.

In one embodiment, each of above sending units, receiving units, and the activating unit may optionally comprise a processor and/or a memory. In another embodiment, one or more processors and/or memories may be external to these units. Furthermore, a computing environment may contain a plurality of computing resources which are in data communication.

Although systems and methods as disclosed, is embodied in the form of various discrete functional blocks, the system could equally well be embodied in an arrangement in which the functions of any one or more of those blocks or indeed, all of the functions thereof, are realized, for example, by one or more appropriately programmed processors or devices.

Another embodiment relates to a system wherein the foregoing embodiments of a method are at least partly implemented, or in other words, to a system adapted for performing the foregoing embodiments of a method. An exemplary system includes at least one programmable processor coupled to a memory subsystem that includes at least one form of memory, e.g., RAM, ROM, and so forth. A storage subsystem may be included that has at least one disk drive and/or CD-ROM drive and/or DVD drive. In some implementations, a display system, a keyboard, and a pointing device may be included as part of a user interface subsystem to provide for a user to manually input information. Ports for inputting and outputting data also may be included. More elements such as network connections, interfaces to various devices, and so forth, may be included. The various elements of the system may be coupled in various ways, including via a bus subsystem for simplicity as a single bus, but will be understood to those in the art to include a system of at least one bus. The memory of the memory subsystem may at some time hold part or all of a set of instructions that when executed on the system implement the step(s) of the method embodiments described herein.

It is to be noted that the processor or processors may be a general purpose, or a special purpose processor, and may be for inclusion in a device, e.g., a chip that has other components that perform other functions. Thus, one or more aspects of the present invention can be implemented in digital electronic circuitry, or in computer hardware, firmware, software, or in combinations of them. Furthermore, aspects of the invention can be implemented in a computer program product stored in a computer-readable medium for execution by a programmable processor. Method steps of aspects of the invention may be performed by a programmable processor executing instructions to perform functions of those aspects of the invention, e.g., by operating on input data and generating output data. Accordingly, the embodiment includes a computer program product which provides the functionality of any of the methods described above when executed on a computing device. Further, the embodiment includes a data carrier such as for example a CD-ROM or a diskette which stores the computer product in a machine-readable form and which executes at least one of the methods described above when executed on a computing device.

The foregoing description details certain embodiments of the invention. It will be appreciated, however, that no matter how detailed the foregoing appears in text, the invention may be practiced in many ways. It should be noted that the use of particular terminology when describing certain features or aspects of the invention should not be taken to imply that the terminology is being re-defined herein to be restricted to including any specific characteristics of the features or aspects of the invention with which that terminology is associated.

While the above detailed description has shown, described, and pointed out novel features of the invention as applied to various embodiments, it will be understood that various omissions, substitutions, and changes in the form and details of the device or process illustrated may be made by those skilled in the technology without departing from the spirit of the invention. The scope of the invention is indicated by the appended claims rather than by the foregoing description. All changes which come within the meaning and range of equivalency of the claims are to be embraced within their scope.

The invention claimed is:

1. A method of collectively delivering electronically certified credentials, the method comprising:
   a. collecting personal data related to credential recipients, the personal data comprising a valid electronic mail address;
   b. collecting, at a granting authority which grants credentials, credential data related to each credential to be delivered to each recipient;
   c. sending to a centralized server of a certifying authority the collected personal data and collected credential data of each recipient, the collected personal data and the collected credential data being stored in a centralized database;

d. sending a personalized e-mail corresponding to each recipient for approval of the credential data related to the each recipient, the e-mail comprising a link to the centralized server;

d1. generating an electronic credential based on approved credential data; and e. activating the electronic credential.

2. The method according to claim 1, wherein the collected credential data related to each recipient is encrypted, the e-mail sent to each recipient comprising a unique key for decrypting the encrypted data upon approval by the recipient.

3. The method according to claim 1, wherein the credential is related to academic diploma.

4. The method according to claim 1, wherein more than one credential data can be stored in the centralized database for each recipient, wherein each of the credential data is approved.

5. The method according to claim 1, wherein the process of sending the collected personal data and collected credential data comprises an authentication procedure for certifying the source of the collected personal data and collected credential data.

6. The method according to claim 1, wherein the process of activating the electronic credential comprises making the generated electronic credential accessible to interested third parties.

7. A method of collectively delivering electronically certified credentials, the method comprising:

a. receiving, in a centralized server of a certifying authority from a granting authority which grants credentials, personal data related to each recipient and credential data related to each credential to be delivered to each recipient, the personal data and the credential data being stored in a centralized database and the personal data comprising at least for each recipient a valid electronic mail address; and b. sending an e-mail to each recipient, the e-mail comprising a hyperlink to the centralized server, for approval of the credential data related to each recipient, generation of an electronic credential based on approved credential data and activation of the electronic credential.

8. The method according to claim 7, wherein the credential data related to each recipient is encrypted, the e-mail sent to each recipient comprising a unique key for decrypting the encrypted data upon approval by the recipient.

9. The method according to claim 7, wherein the credential is related to academic diploma.

10. The method according to claim 7, wherein more than one credential data can be stored in the centralized database, each of the credential data being approved.

11. The method according to claim 7, wherein the process of receiving personal data related to each recipient and each credential comprises an authentication procedure for certifying the source of the personal data and credential data.

12. The method according to claim 7, further comprising making the generated electronic credential accessible to interested third parties.

13. A system for implementing the method of claim 7, the system comprising:

i. communication means for receiving personal data and credential data related to credential information related to recipients, sending e-mails to recipients and getting electronic approval from each recipient;

ii. authentication means for certifying the source of the personal data and the credential data;

iii. a database for storing the personal data and the credential data related to each recipient;

iv. a central processing unit; and v. permanent storage means comprising computer program instructions in a programming language which, when executed on the central processing unit, performs the method of claim 7.

14. The system according to claim 13, further comprising communication means for giving access to the generated electronic credential to interested third parties.

15. The system according to claim 13, further comprising means for encrypting and decrypting the credential data related to each credential.

16. The system according to claim 13, further comprising means for electronically signing electronic credentials.

17. A system for collectively delivering electronically certified credentials, the system comprising:

a receiving unit configured to receive, in a centralized server of a certifying authority from a granting authority which grants credentials, personal data related to each recipient and credential data related to each credential to be delivered to each recipient, the personal data and the credential data being stored in a centralized database and the personal data comprising at least for each recipient a valid electronic mail address; and a sending unit configured to send an e-mail to each recipient, the e-mail comprising a hyperlink to the centralized server, for approval of the credential data related to the each recipient, generation of an electronic credential based on approved credential data and activation of the electronic credential.

* * * * *